US012541131B2

United States Patent
Choi et al.

(10) Patent No.: US 12,541,131 B2
(45) Date of Patent: Feb. 3, 2026

(54) DISPLAY APPARATUS HAVING A LIQUID CRYSTAL PANEL AND AN OPTICAL MODULE

(71) Applicant: LG Display Co., Ltd., Seoul (KR)

(72) Inventors: Eun Hee Choi, Paju-si (KR); Jin Ryun Kim, Paju-si (KR); Ji Gon Kim, Paju-si (KR); Dae Yong Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/977,693

(22) Filed: Dec. 11, 2024

(65) Prior Publication Data

US 2025/0237907 A1    Jul. 24, 2025

(30) Foreign Application Priority Data

Jan. 22, 2024  (KR) .................. 10-2024-0009407

(51) Int. Cl.
*G02F 1/13357*   (2006.01)
*F21V 8/00*      (2006.01)
*G02F 1/1333*    (2006.01)

(52) U.S. Cl.
CPC ..... *G02F 1/133615* (2013.01); *G02B 6/0055* (2013.01); *G02B 6/0068* (2013.01); *G02B 6/0076* (2013.01); *G02F 1/133308* (2013.01)

(58) Field of Classification Search
CPC .. H04N 19/90; H04N 19/97; G02F 1/133615; G02F 1/133308; G02B 6/0055; G02B 6/0068; G02B 6/0076
See application file for complete search history.

(56) References Cited

U.S. PATENT DOCUMENTS

| | | | |
|---|---|---|---|
| 10,514,790 B2 | 12/2019 | Kim et al. | |
| 11,947,152 B1* | 4/2024 | Du | ........ G02B 6/004 |
| 11,947,218 B1* | 4/2024 | Liu | ......... G02F 1/133608 |
| 12,204,190 B2* | 1/2025 | Hou | ......... G02F 1/133605 |
| 2012/0229422 A1 | 9/2012 | Hwang et al. | |
| 2014/0022156 A1 | 1/2014 | Han et al. | |
| 2017/0277323 A1 | 9/2017 | Kim et al. | |

FOREIGN PATENT DOCUMENTS

KR  10-1766978 B1   8/2017

OTHER PUBLICATIONS

Intellectual Property Office of the United Kingdom, Combined Search and Examination Report, United Kingdom Patent Application No. GB2418258.6, Jun. 9, 2025, six pages.

\* cited by examiner

*Primary Examiner* — Matthew J. Peerce
(74) *Attorney, Agent, or Firm* — Fenwick & West LLP (57) ABSTRACT

A display device includes a liquid crystal panel and an optical module. A first light guide plate of a back-light unit may be disposed between the optical module and the liquid crystal panel. The liquid crystal panel may include a sensing area for detecting external light. The optical module may include a second light guide plate overlapping with the sensing area of the liquid crystal panel, and an optical device disposed on a path of external light passing through the first light guide plate and the second light guide plate. The optical module may include a light source device disposed on at least one of sides that are perpendicular to an upper surface of the second light guide plate toward the first light guide plate. Thus, in the display apparatus, the external light may be detected by the optical device, without deteriorating quality of an image provided to a user.

18 Claims, 8 Drawing Sheets

DISPLAY APPARATUS HAVING A LIQUID CRYSTAL PANEL AND AN OPTICAL MODULE

CROSS-REFERENCE TO RELATED APPLICATION

This application claims the priority to and the benefit of Republic Korea Patent Application No. 10-2024-0009407, filed on Jan. 22, 2024, which is hereby incorporated by reference in its entirety.

BACKGROUND

Technical Field

The present disclosure relates to a display apparatus, and more particularly, for example, without a limitation, to a display apparatus in which an optical module is disposed on a side of a liquid crystal panel.

Discussion of the Related Art

Generally, a display apparatus provides an image to a user. For example, the display apparatus includes a back-light unit and a liquid crystal panel generating an image by using light provided from the back-light unit. The back-light unit may include a back-light light source device disposed, for example, on a side surface of a back-light light guide plate. The liquid crystal panel may be disposed on the back-light light guide plate.

As an example, the display apparatus may include an optical module for detecting an external light. For example, the optical module may include at least one of a camera and an IR sensor, without being limited thereto. As an example, the optical module may overlap a region of the liquid crystal panel. For example, the liquid crystal panel may include an active area overlapping with the back-light light guide plate and a sensing area overlapping with the optical module.

The description provided in the background section should not be assumed to be prior art merely because it is mentioned in or associated with the background section. The background section may include information that describes one or more aspects of the subject technology.

SUMMARY

As an example, the sensing area may be disposed in the active area, without being limited thereto. However, since the sensing area of the liquid crystal panel does not emit light for realizing an image, quality of the image provided to the user may be deteriorated by luminance variations between the active area and the sensing area of the display apparatus.

Accordingly, the present disclosure is directed to a display apparatus that substantially obviates one or more problems due to limitations and disadvantages of the related art.

An object of the present disclosure is to provide a display apparatus capable of reducing or minimizing luminance variations between the active area and the sensing area of a liquid crystal panel.

Another object of the present disclosure is to provide a display apparatus in which an optical module may detect external light through a sensing area of the liquid crystal panel, without compromising image quality.

Additional advantages, objects, and features of the disclosure will be set forth in part in the description which follows and in part will become apparent to those having ordinary skill in the art upon examination of the following or may be learned from practice of the disclosure. The objects and other advantages of the disclosure may be realized and attained by the structure particularly pointed out in the written description and claims hereof as well as the appended drawings.

To achieve these objects and other advantages and in accordance with the purpose of the present disclosure, as embodied and broadly described herein, a display apparatus comprises a back-light unit. The back-light unit includes a first light guide plate and a first light source device. A liquid crystal panel is disposed on an upper surface of the first light guide plate. The liquid crystal panel includes a sensing area. An optical module is disposed on a lower surface of the first light guide plate. The optical module includes a second light guide plate, a second light source device and an optical device. An upper surface of the second light guide plate overlaps the sensing area of the liquid crystal panel. The first light guide plate includes a region disposed between the upper surface of the second light guide plate and the liquid crystal panel. The second light source device and the optical device are disposed on different surfaces of the second light guide plate.

The second light source device and the optical device may be disposed outside the sensing area.

The second light source device may be disposed on two opposing sides of sides that are perpendicular to the upper surface of the second light guide plate.

The first light guide plate and the first light source device may be accommodated by a cover bottom. The cover bottom may include a cover hole overlapping with the sensing area of the liquid crystal panel.

The optical device may be disposed on a first side of the second light guide plate that is perpendicular to the upper surface of the second light guide plate. The second light guide plate may include an inclined surface opposite to the first side.

A module reflecting plate may be disposed on the inclined surface of the second light guide plate.

A module sheet may be disposed between the optical device and the second light guide plate. The module sheet may include a module adhesive layer, a module heat insulating layer and a module filter layer. The module adhesive layer may be disposed close to the second light guide plate. The module heat insulating layer may be disposed close to the second light guide plate. The module filter layer may be disposed between the module adhesive layer and the module heat insulating layer.

The optical device may include a camera and a sensor. The module sheet may include a first hole corresponding to the camera and a second hole corresponding to the sensor. The first hole may penetrate the module adhesive layer, the module heat insulating layer and the module filter layer. The second hole may penetrate the module adhesive layer and the module heat insulating layer. The module filter layer may include a region overlapping with the second hole.

A back-light sheet may be disposed between the first light guide plate and the liquid crystal panel. The back-light sheet may include a sheet hole overlapping with the sensing area of the liquid crystal panel.

The second light source device, the second light guide plate and the optical device may be surrounded by a light-blocking cover.

In another exemplary embodiment, a display apparatus comprises a back-light unit. The back-light unit includes a first light guide plate, a first light source device and a cover bottom. The first light source device is disposed on a side surface of the first light guide plate. The cover bottom accommodates the first light source device and the first light guide plate. A liquid crystal panel is disposed on the first light guide plate. The liquid crystal panel includes a sensing area. The cover bottom includes a cover hole overlapping with the sensing area of the liquid crystal panel. An optical module is disposed on the cover bottom. The optical module includes a second light guide plate, a second light source device and an optical device. The second light guide plate overlaps the sensing area of the liquid crystal panel. The second light guide plate includes an upper surface toward the cover bottom. The second light source device is disposed on at least one of sides that are perpendicular to the upper surface of the second light guide plate. The optical device spaced apart from the second light source device is disposed on a path of light that passes through the first light guide plate and the second light guide plate.

A fixing tape may be disposed between the cover bottom and the optical module of the back-light unit. The cover bottom and the optical module may be in contact with the fixing tape. The fixing tape may surround the cover hole.

The second light source device may include a module circuit board and a module light source. The module light source may be mounted on an end portion of the module circuit board. The second light guide plate may include an inclined surface overlapping with the module circuit board at the outside of the module light source.

A reflecting plate may be disposed between the cover bottom and the first light guide plate. The reflecting plate may include a penetrating hole overlapping with the sensing area of the liquid crystal panel.

A back-light sheet may be disposed between the first light guide plate and the liquid crystal panel. The back-light sheet may include a base substrate and an optical element. The optical element may be disposed on the base substrate. The optical element may be disposed outside a region of the base substrate overlapping with the sensing area of the liquid crystal panel.

The second light guide plate may include a lower surface opposite to the upper surface. The optical device may be disposed on the lower surface of the second light guide plate. A semi-transmissive surface inclined with the upper surface and the lower surface may be disposed in the second light guide plate.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Hereinafter, details related to the above objects, technical configurations, and operational effects of the embodiments of the present disclosure will be clearly understood by the following detailed description with reference to the drawings, which illustrate some embodiments of the present disclosure. Here, the embodiments of the present disclosure are provided in order to allow the technical spirit of the present disclosure to be satisfactorily transferred to those skilled in the art, and thus the present disclosure may be embodied in other forms and is not limited to the embodiments described below.

In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Names of the respective elements used in the following explanations may be selected only for convenience of writing the specification and may be thus different from those used in actual products.

In addition, the same or extremely similar elements may be designated by the same reference numerals throughout the specification and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

The terms, such as "below," "lower," "above," "upper" and the like, may be used herein to describe a relationship between element(s) as illustrated in the drawings. It will be understood that the terms are spatially relative and based on the orientation depicted in the drawings.

The term "at least one" should be understood as including any and all combinations of one or more of the associated listed items. For example, the meaning of "at least one of a first element, a second element, and a third element" compasses the combination of all three listed elements, combinations of any two of the three elements, as well as each individual element, the first element, the second element, or the third element.

Here, terms such as, for example, "first" and "second", "A," "B," "(a)," and "(b)," may be used to distinguish any one element with another element. However, the first element and the second element may be arbitrarily named according to the convenience of those skilled in the art without departing the technical spirit of the present disclosure.

The terms used in the specification of the present disclosure are merely used in order to describe particular embodiments, and are not intended to limit the scope of the present disclosure. For example, an element described in the singular form is intended to include a plurality of elements unless the context clearly indicates otherwise. In addition, in the specification of the present disclosure, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

And, unless 'directly' is used, the terms "connected" and "coupled" may include that two components are "connected" or "coupled" through one or more other components located between the two components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in a co-dependent relationship.

EMBODIMENT

Figure 1:
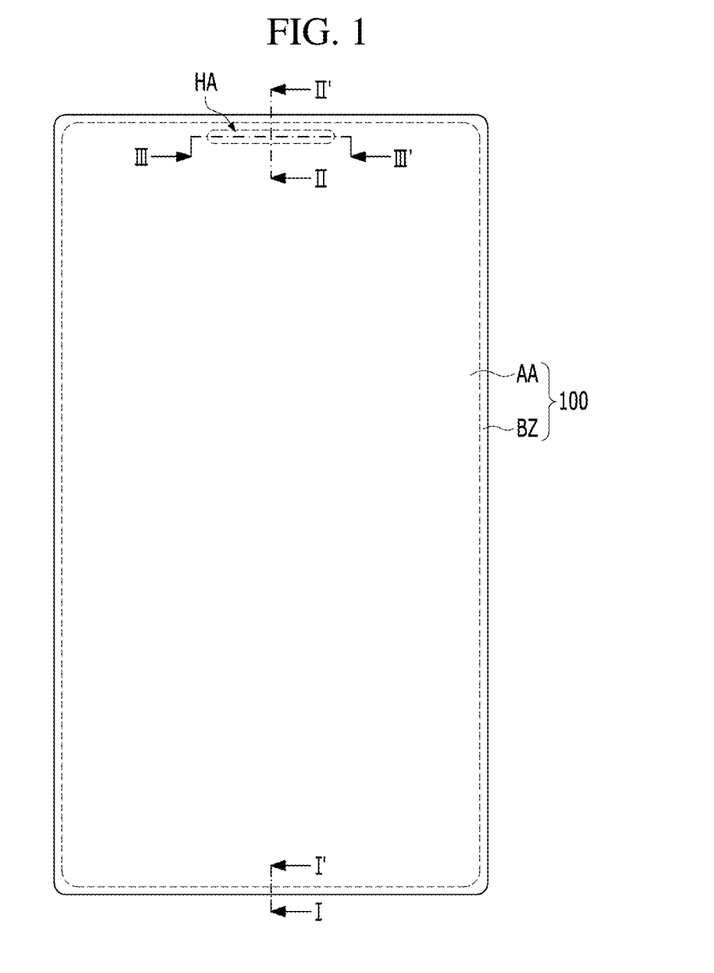
FIG. 1 is a view schematically showing a display apparatus according to an exemplary embodiment of the present disclosure.
Figure 2:
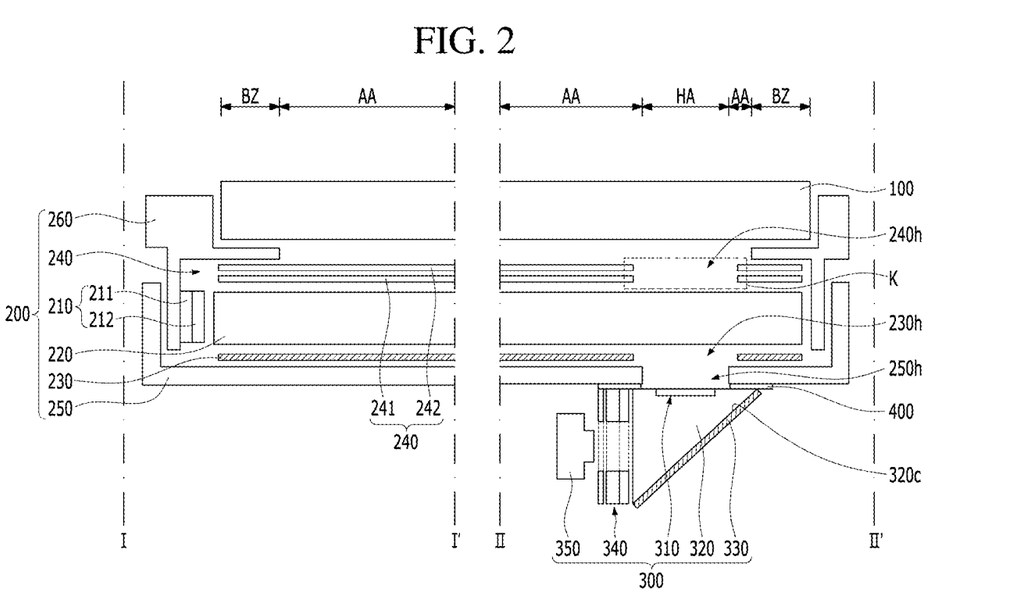
FIG. 2 is a view taken along lines I-I' and II-II' in FIG. 1 according to an exemplary embodiment of the present disclosure.
Figure 3:
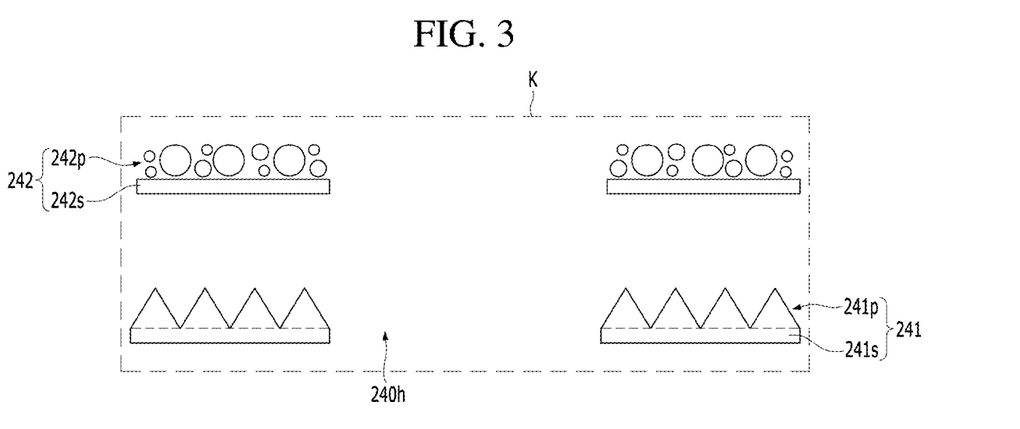
FIG. 3 is an enlarged view of K1 region in FIG. 2 according to an exemplary embodiment of the present disclosure.
Figure 4:
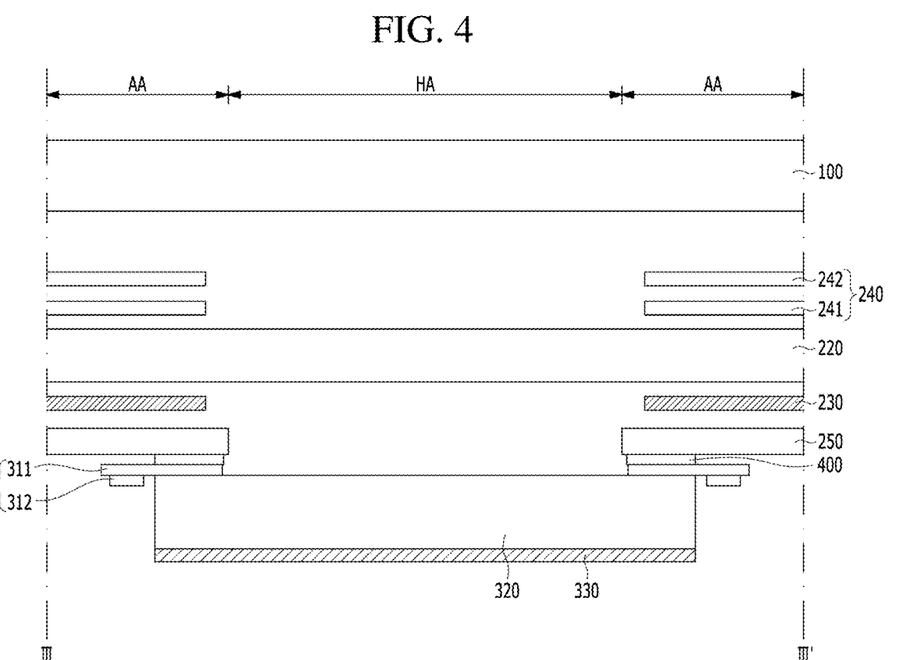
FIG. 4 is a view taken along line III-III' in FIG. 1 according to an exemplary embodiment of the present disclosure.

FIG. 1 is a view schematically showing a display apparatus according to an exemplary embodiment of the present disclosure. FIG. 2 is a view taken along lines I-I' and II-II' in FIG. 1 according to an exemplary embodiment of the present disclosure. FIG. 3 is an enlarged view of K1 region in FIG. 2 according to an exemplary embodiment of the present disclosure. FIG. 4 is a view taken along line III-III' in FIG. 1 according to an exemplary embodiment of the present disclosure.

Referring to FIGS. 1 to 4, the display apparatus according to the exemplary embodiment of the present disclosure may include a liquid crystal panel 100, a back-light unit 200 and an optical module 300. The liquid crystal panel 100 may generate an image provided to a user. For example, the liquid crystal panel 100 may include an active area AA in which a plurality of pixel areas are disposed, and a bezel area BZ disposed outside the active area AA. As an example, the bezel area BZ may be extended from the active area AA. As an example, the bezel area BZ may be disposed to partially or fully surround the active area AA. The liquid crystal panel 100 may include a liquid crystal layer overlapping with the pixel areas. For example, the liquid crystal layer of the liquid crystal panel 100 may include an IPS mode liquid crystal or a TN mode liquid crystal, without being limited thereto. Various signals may be applied to each pixel area PA by signal wirings. For example, the liquid crystals disposed in a region of the liquid crystal layer overlapping with each pixel area may be rotated by a vertical electric field or a horizontal electric field formed in the corresponding pixel area by the signal wirings, without being limited thereto. Thus, in the display apparatus according to the exemplary embodiment of the present disclosure, the image of various colors may be generated by light emitted from the active area AA of the liquid crystal panel 100.

The back-light unit 200 may supply light to the liquid crystal panel 100. For example, the back-light unit 200 may include a back-light light source device 210, a back-light light guide plate 220, a back-light reflecting plate 230 and a back-light sheet 240. Embodiments are not limited thereto. As an example, one or more of the above-mentioned components may be omitted, and/or one or more additional components may be further included.

The back-light light source device 210 may supply light to the liquid crystal panel 100 through the back-light light guide plate 220. For example, the back-light light source device 210 may be disposed on a side surface of the back-light light guide plate 220, without being limited thereto. The liquid crystal panel 100 may be disposed on an upper surface of the back-light light guide plate 220. The back-light light source device 210 may include a back-light circuit board 211 and a back-light light source mounted on the back-light circuit board 211. The back-light light source 212 may be a self-luminous device capable of generating and emitting light. For example, the back-light light source 212 may include LED, without being limited thereto.

The back-light reflecting plate 230 may be disposed on a lower surface of the back-light light guide plate 220. The lower surface of the back-light light guide plate 220 may be opposite to the upper surface of the back-light light guide plate 220. For example, the back-light light guide plate 220 may be disposed between the back-light reflecting plate 230 and the liquid crystal panel 100. The back-light reflecting plate 230 may include a material capable of reflecting light. For example, the back-light reflecting plate 230 may include a metal, such as aluminum (Al) and silver (Ag), without being limited thereto. Thus, in the display apparatus according to the exemplary embodiment of the present disclosure, light emitted through the lower surface of the back-light light guide plate 220 may be reflected toward the liquid crystal panel 100 by the back-light reflecting plate 230. Therefore, in the display apparatus according to the exemplary embodiment of the present disclosure, the amount of the light supplied to the liquid crystal panel 100 by the back-light unit 200 may be increased.

The back-light sheet 240 may be disposed between the back-light light guide plate 220 and the liquid crystal panel 100. The light supplied to the liquid crystal panel 100 through the back-light light guide plate 220 may have uniform luminance overall by the back-light sheet 240. For example, the back-light sheet 240 may have a stacked structure of a prism sheet 241 and a diffusion sheet 242.

As an example, the prism sheet 241 may include a prism element 241p disposed on a first base substrate 241s. For example, the cross-sectional shape of the prism element 241p may have a shape in which triangles are repeatedly arranged, without being limited thereto. As an example, the cross-sectional shape of the prism element 241p may have various shapes such as a curved shape, an angular shape, a circular shape, etc. The first base substrate 241s may include a transparent material. For example, the first base substrate 241s may include plastic, glass, etc., without being limited thereto. The prism element 241p may include a transparent material. For example, the prism element 241p may be formed of a same material as the first base substrate 241s, without being limited thereto. As an example, the prism element 241p may be formed of a different material from the first base substrate 241s. An interface between the first base substrate 241s and the prism element 241p may not be recognized. As an example, the first base substrate 241s and the prism element 241p may be integrally formed, or may be separately formed.

The diffusion sheet 242 may include diffusion particles 242p dispersed on a second base substrate 242s. The second base substrate 242s may include a transparent material. For example, the second base substrate 242s may include plastic, glass, etc., without being limited thereto. The second base substrate 242s may include a same material as the first base substrate 241s, or a different material from the first base substrate 241s. The diffusion particles 242p may have various sizes. Thus, in the display apparatus according to the exemplary embodiment of the present disclosure, uniformity of the light supplied to the liquid crystal panel 100 through the back-light sheet 240 may be improved. As an example, the diffusion particles 242p may be fixed on the second base substrate 242s. As an example, the diffusion particles 242p may be fixed on the second base substrate 242s by a transparent adhesive, such as a transparent resin, without being limited thereto.

The back-light unit 200 may include a cover bottom 250 for accommodating the back-light light source device 210, the back-light light guide plate 220, the back-light reflecting plate 230 and the back-light sheet 240. As an example, the cover bottom 250 may include an insulating material, without being limited thereto. For example, the cover bottom 250 may include plastic, glass, ceramics, etc. The cover bottom 250 may include a bottom surface and a side-wall protruding an edge of the bottom surface. The back-light reflecting plate 230 may be disposed between the back-light light guide plate 220 and the bottom surface of the cover bottom 250. The back-light light source device 210, the back-light light guide plate 220 and the back-light sheet 240 may be disposed within a space formed by the side-wall of the cover bottom 250. For example, the side-wall of the cover bottom 250 may partially or fully surround at least one of the back-light light source device 210, the back-light light guide plate 220 and the back-light sheet 240.

The back-light unit 200 may include a middle frame 260 for supporting the liquid crystal panel 100. The middle frame 260 may be coupled with the cover bottom 250. For example, the middle frame 260 may include a coupling region extending between the cover bottom 250 and the back-light light guide plate 220. As an example, the back-light light source device 210 may be fixed on the coupling region of the middle frame 260, without being limited thereto. For example, the back-light light source device 210 may be attached to the coupling region of the middle frame 260 by an adhesive element or a fixing member such as a bolt, or a clip, without being limited thereto. The middle frame 260 may include a seating region extending between the back-light sheet 240 and the liquid crystal panel 100. The seating region of the middle frame 260 may overlap an edge of the back-light sheet 240. For example, the seating region of the middle frame 260 may overlap a portion of or the entirety of the bezel area BZ of the liquid crystal panel 100. The active area AA of the liquid crystal panel 100 may not overlap the seating region of the middle frame 260. For example, a central region of the back-light sheet 240 may be exposed by the middle frame 260. As an example, the seating region of the middle frame 260 may be in direct contact with the back-light sheet 240. Thus, in the display apparatus according to the exemplary embodiment of the present disclosure, the movement of the back-light sheet 240 may be reduced or prevented by the middle frame 260. Embodiments are not limited thereto. As an example, the seating region of the middle frame 260 may be spaced apart from the back-light sheet 240.

The optical module 300 may detect external light through the liquid crystal panel 100 and the back-light unit 200. For example, the optical module 300 may be disposed on the cover bottom 250 of the back-light unit 200. As an example, the optical module 300 may be in contact with or spaced apart from the cover bottom 250 of the back-light unit 200. The liquid crystal panel 100 may include a sensing area HA for sensing the external light. As an example, the sensing area HA may be disposed within the active area AA. For example, the back-light reflecting plate 230 may include a penetrating hole 230h overlapping with the sensing area HA of the liquid crystal panel 100, the back-light sheet 240 may include a sheet hole 240h overlapping with the sensing area HA of the liquid crystal panel 100, and the cover bottom 250 may include a cover hole 250h overlapping with the sensing area HA of the liquid crystal panel 100. The first base substrate 241s and the second base substrate 242s of the back-light sheet 240 may not overlap the sensing area HA of the liquid crystal panel 100. As an example, the optical module 300 may include a module light source device 310, a module light guide plate 320, a module reflecting plate 330, a module sheet 340 and an optical device 350, without being limited thereto. As an example, one or more of the above-mentioned components may be omitted, and/or one or more additional components may be further included.

Figure 5:
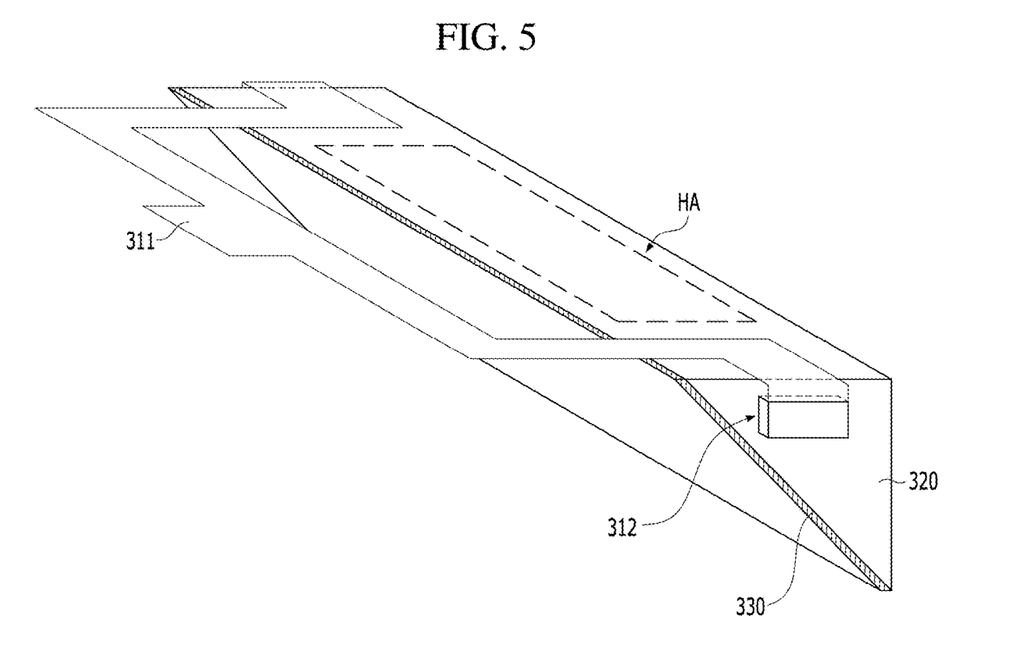
FIG. 5 is a view showing a module light source device, a module light guide plate and a module reflecting plate of an optical module in the display apparatus according to the exemplary embodiment of the present disclosure.
Figure 6:
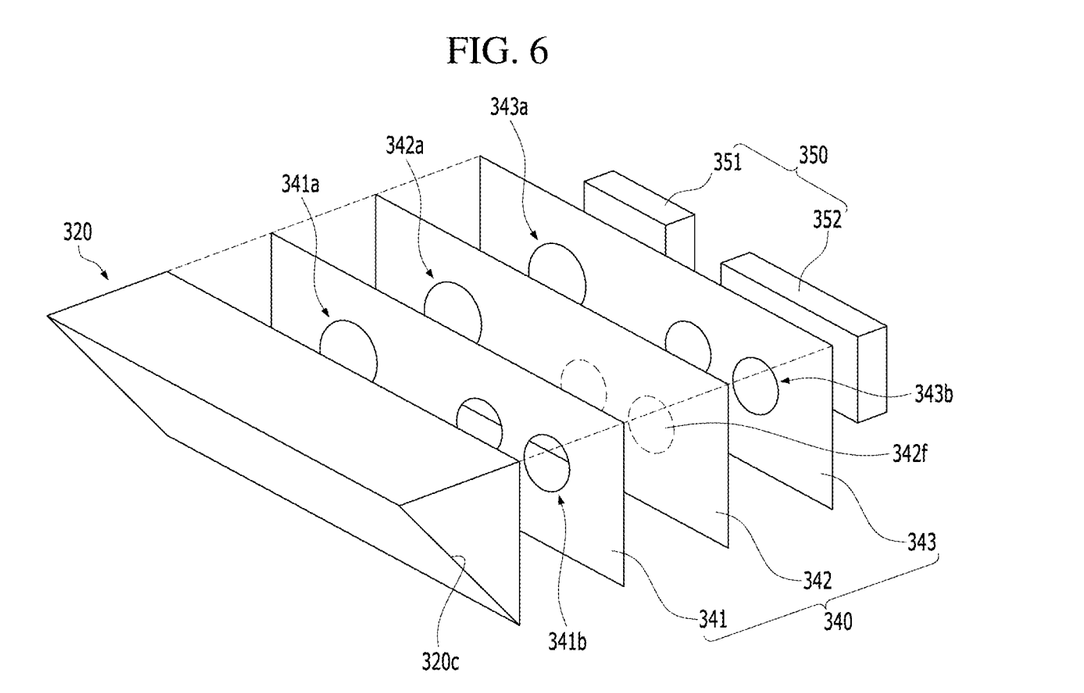
FIG. 6 is a view showing a module light guide plate, a module sheet and an optical device of the optical module in the display apparatus according to the exemplary embodiment of the present disclosure.

FIG. 5 is a view showing the module light source device 310, the module light guide plate 320 and the module reflecting plate 330 of the optical module 300 in the display apparatus according to the exemplary embodiment of the present disclosure. FIG. 6 is a view showing the module light guide plate 320, the module sheet 340 and the optical device 350 of the optical module 300 in the display apparatus according to the exemplary embodiment of the present disclosure.

Referring to FIGS. 2 and 4 to 6, the module light source device 310 may be disposed on opposing sides of the module light guide plate 320, and the module light guide plate 320 may overlap the sensing area HA of the liquid crystal panel 100. The sides of the module light guide plate 320 on which the module light source device 310 is disposed may be perpendicular to an upper surface of the module light guide plate 320 toward the back-light light guide plate 220. The module light guide plate 320 may include an inclined surface 320c overlapping with the sensing area HA of the liquid crystal panel 100. For example, the module light source device 310 may be disposed on the sides of the module light guide plate 320 that are perpendicular to the upper surface and the inclined surface 320c of the module light guide plate 320. Thus, in the display apparatus according to the exemplary embodiment of the present disclosure, light emitted from the module light source device 310 may be supplied to the sensing area HA of the liquid crystal panel 100 by the inclined surface 320c of the module light guide plate 320.

The module light source device 310 may include a module circuit board 311 and module light sources 312.

Each of the module light sources 312 may be a self-luminous device capable of generating and emitting light. For example, each of the module light sources 312 may include LED, OLED, Micro-LED, without being limited thereto. The module light sources 312 may be a same device as the back-light light source 212, without being limited thereto. As an example, the module light sources 312 may be a different device from the back-light light source 212. Each of the module light sources 312 may be mounted on an end portion of the module circuit board 311, without being limited thereto. As an example, at least one of the module light sources 312 may be mounted on a portion other than the end portion of the module circuit board 311, without being limited thereto. For example, the module light sources 312 may be turned on/off simultaneously, independently, or separately. As an example, the module light sources 312 may be driven simultaneously with the back-light light source 212, without being limited thereto. As an example, the module light sources 312 may be driven independently, or separately from the back-light light source 212. For example, in the display apparatus according to the exemplary embodiment of the present disclosure, the liquid crystal panel 100 may generate the image by using light emitted from the back-light light source device 210 and light emitted from the module light source device 310. That is, in the display apparatus according to the exemplary embodiment of the present disclosure, when the liquid crystal panel 100 generates the image, light may be supplied to the sensing area HA of the liquid crystal panel 100 by the module light source device 310. Thus, in the display apparatus according to the exemplary embodiment of the present disclosure, when the liquid crystal panel 100 generates the image, as an example, the light supplied to the sensing area HA may have substantially a same luminance as the light supplied to the active area AA. Therefore, in the display apparatus according to the exemplary embodiment of the present disclosure, deterioration in quality of the image due to luminance variations between the active area AA and the sensing area HA may be reduced or prevented. Embodiments are not limited thereto. As an example, when the liquid crystal panel 100 generates the image, the light supplied to the sensing area HA may have a different luminance from the light supplied to the active area AA.

The module reflecting plate 330 may be disposed on the inclined surface 320c of the module light guide plate 320. The module reflecting plate 330 may include a material capable of reflecting light. For example, the module reflecting plate 330 may include a metal, such as aluminum (Al) and silver (Ag), without being limited thereto. As an example, the module reflecting plate 330 may include a same material as the back-light reflecting plate 230, without being limited thereto. As an example, the module reflecting plate 330 may include a different material from the back-light reflecting plate 230. Thus, in the display apparatus according to the exemplary embodiment of the present disclosure, the light emitted through the inclined surface 320c of the module light guide plate 320 may be reflected toward the inside of the module light guide plate 320 by the module reflecting plate 330. Thus, in the display apparatus according to the exemplary embodiment of the present disclosure, the amount of the light supplied to the sensing area HA of the liquid crystal panel 100 through the module light guide plate 320 may be increased.

The module sheet 340 may be disposed on a side of the module light guide plate 320 opposite to the inclined surface 320c. The optical device 350 may be disposed on the module sheet 340. For example, in the display apparatus according to the exemplary embodiment of the present disclosure, the external light applied to the module light guide plate 320 through the sensing area HA of the liquid crystal panel 100 and the back-light light guide plate 220 may be supplied to the optical device 350 through the module sheet 340. The external light applied through the sensing area HA of the liquid crystal panel 100 may pass through the sheet hole 240h of the back-light sheet 240. Thus, in the display apparatus according to the exemplary embodiment of the present disclosure, the external light supplied to the optical device 350 may not be refracted and/or diffused by the back-light sheet 240. That is, in the display apparatus according to the exemplary embodiment of the present disclosure, the external light may be detected by the optical device 350, without distortion by the back-light sheet 240. Therefore, in the display apparatus according to the exemplary embodiment of the present disclosure, characteristics in detection of the external light may be improved.

The module sheet 340 may be disposed between the module light guide plate 320 and the optical device 350. For example, the module sheet 340 may have a stacked structure of a module adhesive layer 341, a module filter layer 342 and a module heat insulating layer 343. The module adhesive layer 341 may be disposed close to the module light guide plate 320. The module adhesive layer 341 may be in direct contact with the module light guide plate 320. For example, the module sheet 340 may be attached to the module light guide plate 320. For example, the module sheet 340 may be attached to the module light guide plate 320 by the module adhesive layer 341. The module heat insulating layer 343 may be disposed close to the optical device 350. Thus, in the display apparatus according to the exemplary embodiment of the present disclosure, damage or deformation of the module sheet 340 due to heat generated by operation of the optical device 350 may be reduced or prevented. The module filter layer 342 may be disposed between the module adhesive layer 341 and the module heat insulating layer 343. As an example, the module filter layer 342 may reduce or prevent the diffusion of visible light among the light traveling toward the optical device 350 through the module light guide plate 320. Here, the visible light means light recognized by the human eye. For example, light having a wavelength range of about 400 nm to 700 nm may not pass through the module filter layer 342. Therefore, in the display apparatus according to the exemplary embodiment of the present disclosure, the distortion of light supplied to the optical device 350 due to diffuse reflection and/or regular reflection of the visible light may be reduced or prevented. Embodiments are not limited thereto. As an example, the module filter layer 342 may reduce or prevent the diffusion of a light of a wavelength range other than the wavelength range of about 400 nm to 700 nm among the light traveling toward the optical device 350 through the module light guide plate 320. As an example, the module filter layer 342 may be omitted. As an example, the module heat insulating layer 343 may be omitted.

The optical device 350 may include a device capable of detecting the external light. For example, the optical device 350 may include a camera 351 and/or an IR sensor 352. The module sheet 340 may include a first hole 341a, 342a and 343a corresponding to the camera 351, and a second hole 341b and 343b corresponding to the IR sensor 352. The first hole 341a, 342a and 343a of the module sheet 340 may penetrate the module adhesive layer 341, the module filter layer 342 and the module heat insulating layer 343. For example, the first hole 341a, 342a and 343a of the module sheet 340 may be composed of a first adhesive hole 341a penetrating the module adhesive layer 341, a filter hole 342a penetrating the module filter layer 342, and a first module hole 343a penetrating the module heat insulating layer 343. The second hole 341b and 343b of the module sheet 340 may penetrate the module adhesive layer 341 and the module heat insulating layer 343. The module filter layer 342 may include a filter region 342f overlapping with the second hole 341b and 343b of the module sheet 340. For example, the second hole 341b and 343b of the module sheet 340 may be composed of a second adhesive hole 341b penetrating the module adhesive layer 341 and a second module hole 343b penetrating the module heat insulating layer 343. Thus, in the display apparatus according to the exemplary embodiment of the present disclosure, the external light passing through the first hole 341a, 342a and 343a of the module sheet 340 may be supplied to the camera 351, and the external light passing through the second hole 341b and 343b of the module sheet 340 may be supplied to the IR sensor 352. That is, in the display apparatus according to the exemplary embodiment of the present disclosure, the external light including the visible light may be supplied to the camera 351, and the visible light of the external light traveling toward the IR sensor 352 may be blocked by the filter region 342f of the module filter layer 342. Therefore, in the display apparatus according to the exemplary embodiment of the present disclosure, deterioration in detecting characteristics of the IR sensor 352 due to the visible light may be reduced or prevented.

The optical module 300 may be fixed on the back-light unit 200, without being limited thereto. For example, a fixing tape 400 may be disposed between the cover bottom 250 and the optical module 300. The fixing tape 400 may be in direct contact with the cover bottom 250 and the optical module 300. For example, the optical module 300 may be attached to the cover bottom 250 by the fixing tape 400. Thus, in the display apparatus according to the exemplary embodiment of the present disclosure, the movement of the optical module 300 may be reduced or prevented. Therefore, in the display apparatus according to the exemplary embodiment of the present disclosure, characteristics of detecting the external light by the optical device 350 of the optical module 300 may be improved. Embodiments are not limited thereto. As an example, the optical module 300 may be fixed on other components of the liquid crystal panel 100 other than the back-light unit 200. As an example, the fixing tape 400 may be disposed between the back-light light guide plate 220 and the optical module 300. As an example, the fixing tape 400 may be in direct contact with the back-light light guide plate 220 and the optical module 300, without being limited thereto.

Accordingly, the display apparatus according to the exemplary embodiment of the present disclosure may include the liquid crystal panel 100 disposed on the upper surface of the back-light light guide plate 220 and the optical module 300 disposed on the lower surface of the back-light light guide plate 220, wherein the liquid crystal panel 100 may include the sensing area HA for detecting the external light, and wherein the optical module 300 may include the module light guide plate 320 overlapping with the sensing area HA, the module light source device 310 disposed on the sides of the module light guide plate 320 that are perpendicular to the inclined surface 320c, and the optical device 350 disposed opposite to the inclined surface 320c of the module light guide plate 320. Thus, in the display apparatus according to the exemplary embodiment of the present disclosure, when the liquid crystal panel 100 generates an image, the light supplied to the sensing area HA of the liquid crystal panel 100 by the module light source device 310 turned on/off simultaneously with the back-light light source device 210 may have a same luminance as the light supplied to the active area AA of the liquid crystal panel 100 by the back-light light source device 210. And, in the display apparatus according to the exemplary embodiment of the present disclosure, when the liquid crystal panel 100 does not generate an image, the external light applied through the sensing area HA of the liquid crystal panel 100, the back-light light guide plate 220 and the module light guide plate 320 may be detected by the optical device 350. Therefore, in the display apparatus according to the exemplary embodiment of the present disclosure, the external light may be detected, without the deterioration in quality of the image.

The display apparatus according to the exemplary embodiment of the present disclosure is described that the optical device 350 may include the camera 351 and the IR sensor 352. However, in the display apparatus according to another exemplary embodiment of the present disclosure, the optical device 350 may include various devices. For example, in the display apparatus according to another exemplary embodiment of the present disclosure, the optical device 350 may include one of the camera 351 and the IR sensor 352. And, in the display apparatus according to another exemplary embodiment of the present disclosure, the optical device 350 may include at least one of various sensors. For example, in the display apparatus according to another exemplary embodiment of the present disclosure, the optical device 350 may include at least one of a motion sensor, an illuminance sensor and an ultrasonic sensor. Thus, in the display apparatus according to another exemplary embodiment of the present disclosure, the degree of freedom in configuration of the optical device 350 may be improved.

The display apparatus according to the exemplary embodiment of the present disclosure is described that each of the module light sources 312 may be a same as the back-light light source 212. However, in the display apparatus according to another exemplary embodiment of the display apparatus, the type of each module light sources 312 and the number of the module light sources 312 may be determined according to a luminance of the light supplied to the active area AA of the liquid crystal panel 100 by the back-light light source 212. And, in the display apparatus according to another exemplary embodiment of the display apparatus, the type of each module light sources 312 and the number of the module light sources 312 may be determined according to an area ratio between the active area AA and the sensing area HA of the liquid crystal panel 100. That is, in the display apparatus according to another exemplary embodiment of the present disclosure, when the liquid crystal panel 100 generates an image, the type of each module light sources 312 and the number of the module light sources 312 may be adjusted so that luminance of the light supplied to the sensing area HA of the liquid crystal panel 100 may be substantially a same as luminance of the light supplied to the active area AA of the liquid crystal panel 100. Thus, in the display apparatus according to another exemplary embodiment of the present disclosure, the deterioration in the quality of the image due to the luminance variations between the active area AA and the sensing area HA of the liquid crystal panel 100 may be effectively reduced or prevented. As an example, the type of each module light sources 312 may be different from the type of the back-light light source 212. As an example, the number of the module light sources 312 may be more than two, such as three, four or eight. As an example, the module light sources 312 may be disposed on other portions of the module light guide plate 320 in addition to the sides of the module light guide plate 320.

In the display apparatus according to another exemplary embodiment of the present disclosure, the module heat insulating layer 343 may include a material capable of absorbing light. For example, the module heat insulating layer 343 may include a black dye, such as carbon black. The module heat insulating layer 343 may have a single layer structure or a multi-layer structure. For example, the module heat insulating layer 343 may have a two-layer structure of a heat insulating layer and an absorbing layer. Thus, in the display apparatus according to another exemplary embodiment of the present disclosure, light traveling through a region of the module sheet 340 that does not overlap the optical device 350 may be blocked by the module heat insulating layer 342. Therefore, in the display apparatus according to another exemplary embodiment of the present disclosure, characteristics of detecting the external light may be improved. Embodiments are not limited thereto. As an example, the module heat insulating layer 343 may include a material not absorbing light. As an example, the module heat insulating layer 343 may include a transparent material. As an example, the module heat insulating layer 343 may be omitted according to the design.

Figure 7:
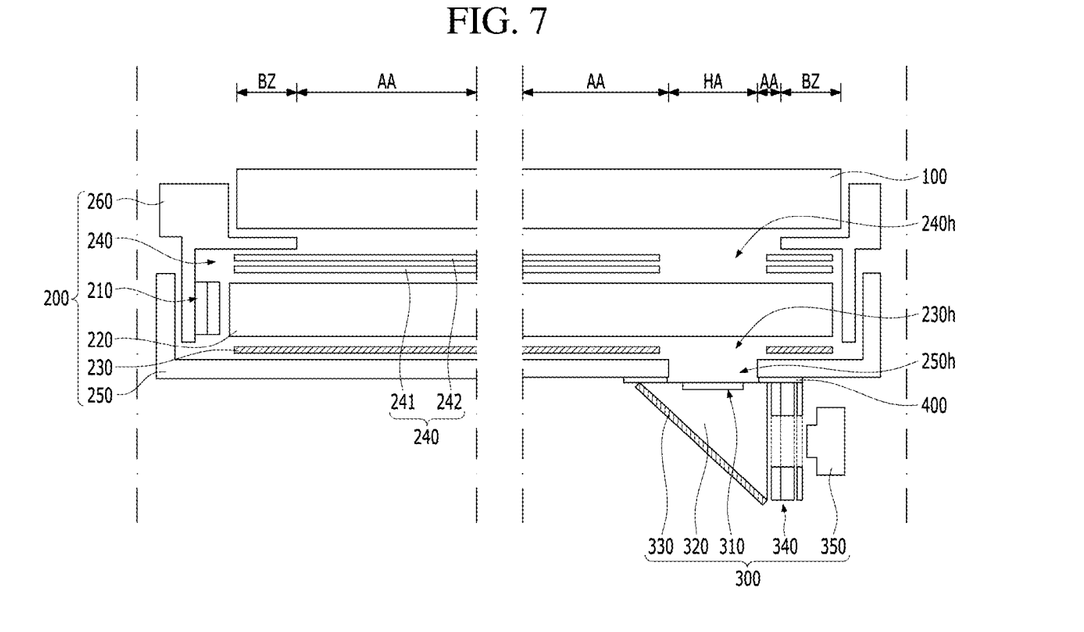
FIGS. 7 to 14 are views showing the display apparatus according to another exemplary embodiment of the present disclosure.

The display apparatus according to the exemplary embodiment of the present disclosure is described that the optical device 350 may be disposed close to the central region of the back-light unit 200. However, in the display apparatus according to another exemplary embodiment of the present disclosure, the optical device 350 may be disposed on various locations. For example, in the display apparatus according to another exemplary embodiment of the present disclosure, the optical device 350 may be disposed on a side surface of the module light guide plate 320 toward the outside of the back-light unit 200, as shown in FIG. 7. The inclined surface of the module light guide plate 320 may be disposed close to the central region of the back-light unit 200. Thus, in the display apparatus according to another exemplary embodiment of the present disclosure, the degree of freedom in configuration of the location of the optical device 350 may be improved. Embodiments are not limited thereto. As an example, the optical device 350 may be disposed on a side surface of the module light guide plate 320 toward any other directions other than the direction toward the central region and the outside of the back-light unit 200.

Figure 8:
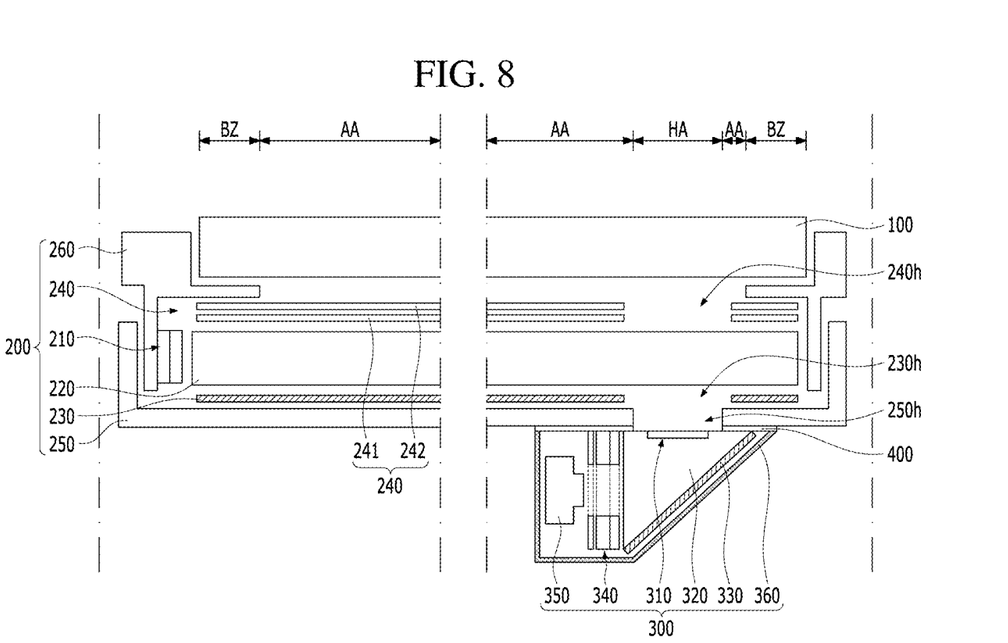

In the display apparatus according to another exemplary embodiment of the present disclosure, the progress of the external light that does not pass through the liquid crystal panel 100 and the back-light unit 200 in the direction of the module light guide plate 320 may be blocked. For example, in the display apparatus according to another exemplary embodiment of the present disclosure, the optical module 300 may include a light-blocking cover 360 partially or fully surrounding the module light source device 310, the module light guide plate 320, the module sheet 340 and the optical device 350, as shown in FIG. 8. As an example, the light-blocking cover 360 may be attached to the cover bottom 250 by the fixing tape 400, without being limited thereto. As an example, the light-blocking cover 360 may be attached to the cover bottom 250 by any other means other than the fixing tape 400. Thus, in the display apparatus according to another exemplary embodiment of the present disclosure, detection of the external light that does not pass through the liquid crystal panel 100 and the back-light unit 200 by the optical device 350 may be reduced or prevented. That is, in the display apparatus according to another exemplary embodiment of the present disclosure, unintentional external light may not be detected. Therefore, in the display apparatus according to another exemplary embodiment of the present disclosure, characteristics of detecting the external light through the sensing area HA of the liquid crystal panel 100 may be effectively improved.

The display apparatus according to the exemplary embodiment of the present disclosure is described that the prism element 241*p* may include a same material as the first base substrate 241*s*. However, in the display apparatus according to another exemplary embodiment of the present disclosure, the first base substrate 241*s* may include a different material from the prism element 241*p*. For example, transmittance of the first base substrate 241*s* may be higher than transmittance of the prism element 241*p*. Thus, in the display apparatus according to another exemplary embodiment of the present disclosure, the degree of freedom in configuration of the prism sheet 241 may be improved.

Figure 9:
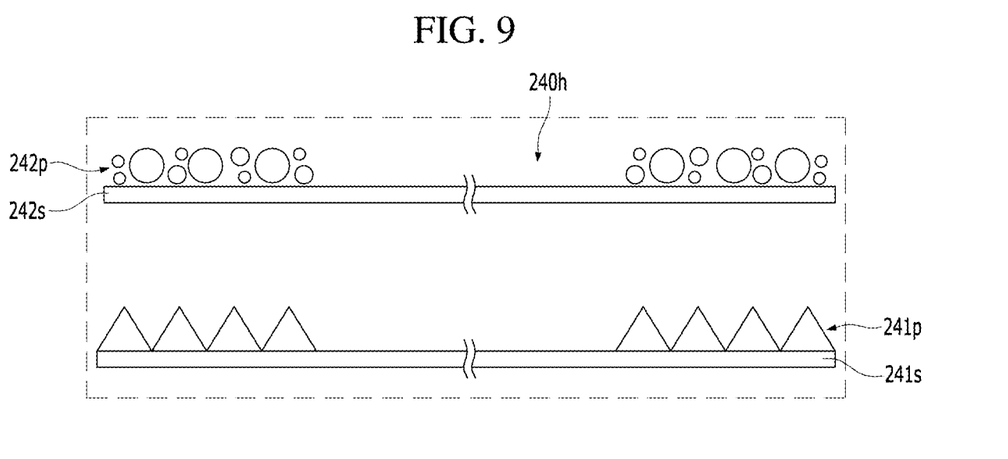

In the display apparatus according to another exemplary embodiment of the present disclosure, at least one of the first base substrate 241*s* and the second base substrate 242*s* may include a region disposed outside the corresponding optical element, for example, the prism element 241*p* or the diffusion particles 242*p*. For example, in the display apparatus according to another exemplary embodiment of the present disclosure, the first base substrate 241*s* and the second base substrate 242*s* may extend in the inner direction of the sheet hole 240*h*, as shown in FIG. 9. At least one of the first base substrate 241*s* and the second base substrate 242*s* may include a region overlapping with the sensing area of the liquid crystal panel. The sheet hole 240*h* may be a region in which the prism element 241*p* and the diffusion particles 242*p* are not formed. As an example, in the display apparatus according to another exemplary embodiment of the present disclosure, a process of forming a hole in the first base substrate 241*s* and a process of forming a hole in the second base substrate 242*s* may be omitted. Thus, in the display apparatus according to another exemplary embodiment of the present disclosure, efficiency in process of forming the back-light sheet 240 may be improved.

Figure 10:
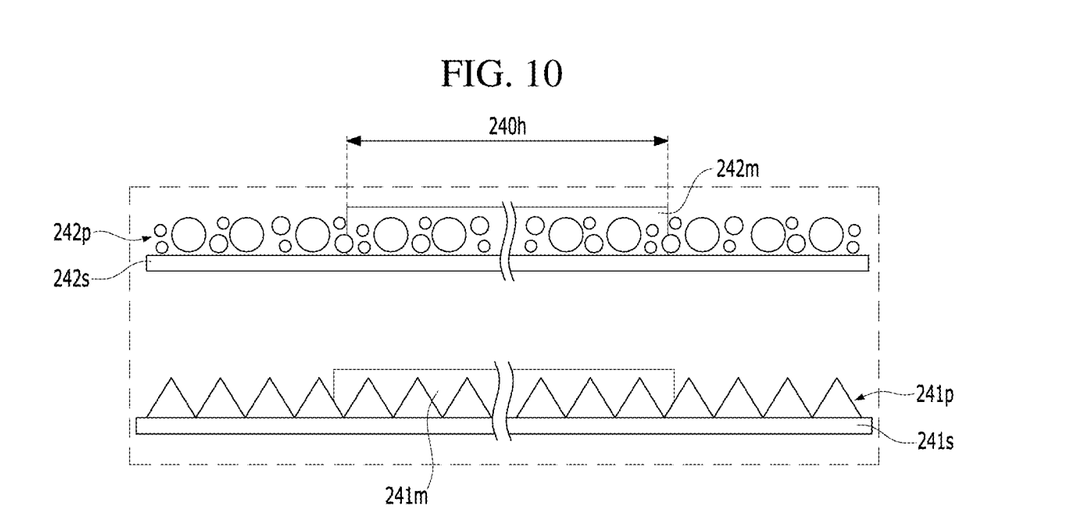

In the display apparatus according to another exemplary embodiment of the present disclosure, the prism element 241*p* may be formed on an entire surface of the first base substrate 241*s*, the diffusion particles 242*p* may be formed an entire surface of the second base substrate 242*s*, a portion of the prism element 241*p* overlapping with the sensing area of the liquid crystal panel may be covered by a first index matching element 241*m*, and a portion of the diffusion particles 242*p* overlapping with the sensing area of the liquid crystal panel may be covered by a second index matching element 242*m*, as shown in FIG. 10. The first index matching element 241*m* may include a material that may at least partially cancel out refraction caused by the prism element 241*p*. The second index matching element 242*m* may include a material that can at least partially cancel out refraction caused by the diffusion particles 242*p*. Thus, in the display apparatus according to another exemplary embodiment of the present disclosure, the sheet hole 240*h* through which the external light passes without being refracted by the prism element 241*p* and the diffusion particles 242*p* may be formed by the first index matching element 241*m* and the second index matching element 242*m*. As an example, in the display apparatus according to another exemplary embodiment of the present disclosure, a process of removing the prism element 241*p* formed on a portion of the first base substrate 241*s* overlapping with the sensing area of the liquid crystal panel and a process of removing the diffusion particles 242p formed on a portion of the second base substrate 242s overlapping with the sensing area of the liquid crystal panel may be omitted. Therefore, in the display apparatus according to another exemplary embodiment of the present disclosure, process efficiency may be effectively improved.

Figure 11:
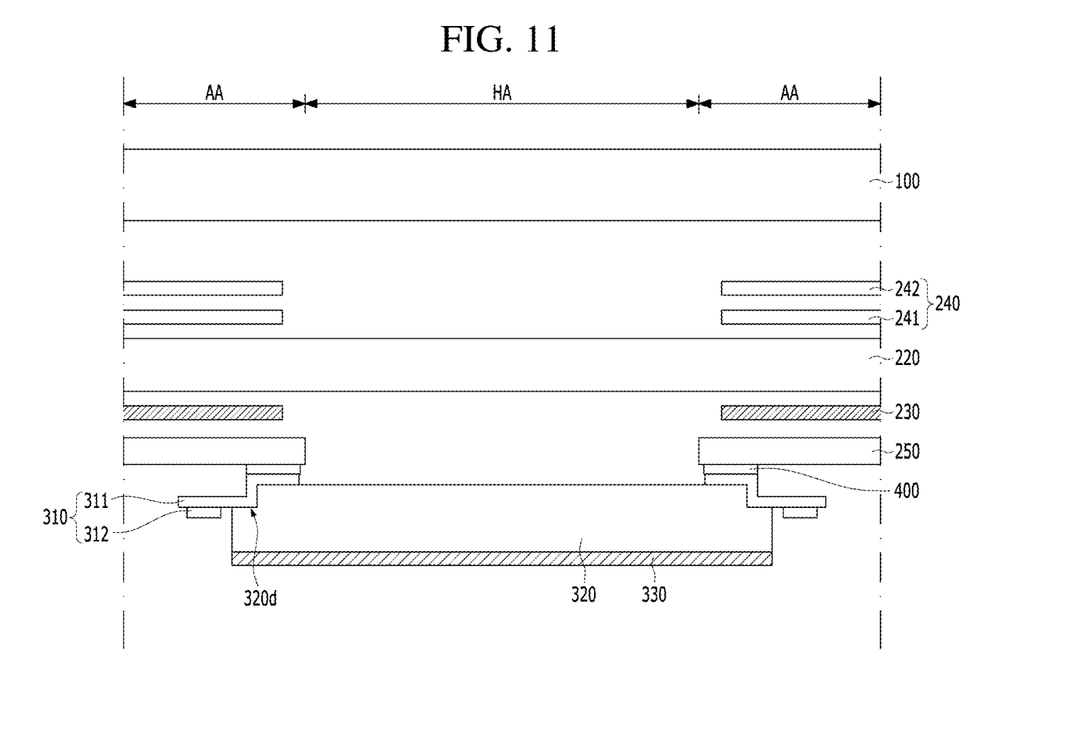

The display apparatus according to the exemplary embodiment of the present disclosure is described that the module circuit board 311 may be disposed parallel to the upper surface of the module light guide plate 320 toward the back-light light guide plate 220, and the module light sources 312 may be mounted on end portions of the module circuit board 311. However, in the display apparatus according to another exemplary embodiment of the present disclosure, the module light sources 312 may be disposed close to a central portion of the module light guide plate 320. For example, in the display apparatus according to another exemplary embodiment of the present disclosure, a stepped portion 320d may be formed on an upper portion of a side surface of the module light guide plate 320 toward each module light source 312, as shown in FIG. 11. The module circuit board 311 may extend along the stepped portion 320d of the module light guide plate 320. Thus, in the display apparatus according to another exemplary embodiment of the present disclosure, a decrease in efficiency depending on the positions of the module light sources 312 may be reduced or prevented. And, in the display apparatus according to another exemplary embodiment of the present disclosure, a luminance difference between the active area AA and the sensing area HA due to a decrease in the efficiency of the module light sources 312 may be reduced or prevented.

Figure 12:
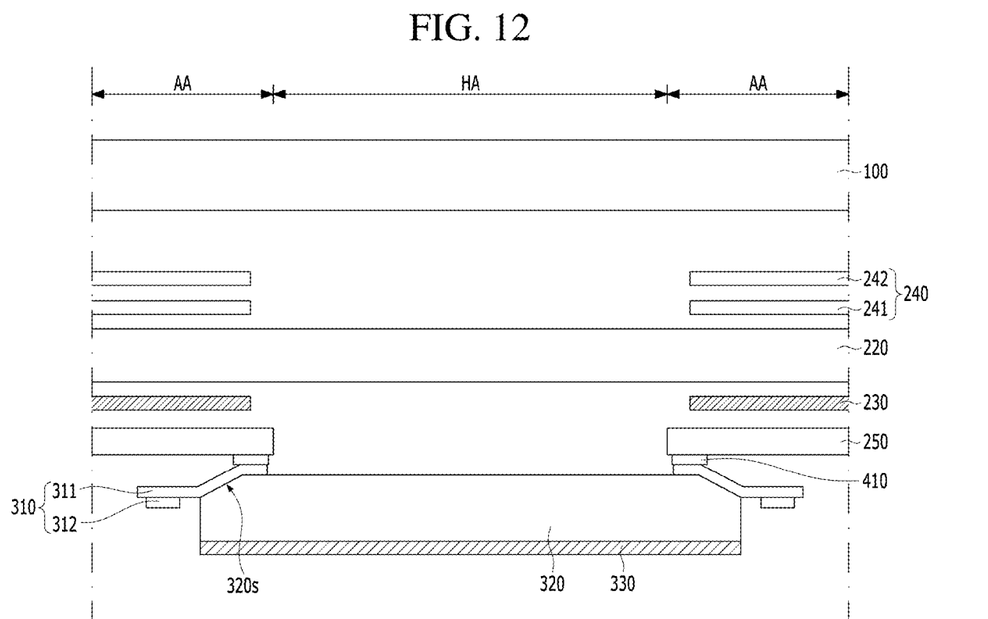

In the display apparatus according to another exemplary embodiment of the present disclosure, the module light guide plate 320 may have various shapes, in order to move the positions of the module light sources 312. For example, in the display apparatus according to another exemplary embodiment of the present disclosure, a portion of the module light guide plate 320 overlapping with the module light source device 310 may be recessed to form a groove in the module light guide plate 320, and the module light source device 310 may be inserted into the groove of the module light guide plate 320. And, in the display apparatus according to another exemplary embodiment of the present disclosure, a side surface of the module guide plate 320 toward each module light source 312 may include an inclined region 320s, as shown in FIG. 12. The inclined region 320s of the module light guide plate 320 may overlap the module circuit board 311 at the outside of the module light sources 312. For example, the module circuit board 311 may be in direct contact with the inclined region 320s of the module light guide plate 320. Thus, in the display apparatus according to another exemplary embodiment of the present disclosure, damage of the module circuit board 311 due to a shape of the module light guide plate 320 may be reduced or prevented. As an example, in the display apparatus according to another exemplary embodiment of the present disclosure, a decrease in efficiency depending on the positions of the module light sources 312 may be reduced or prevented, without damage to the module circuit board 311. Therefore, in the display apparatus according to another exemplary embodiment of the present disclosure, a luminance difference between the active area AA and the sensing area HA may be reduced or prevented.

Figure 13:
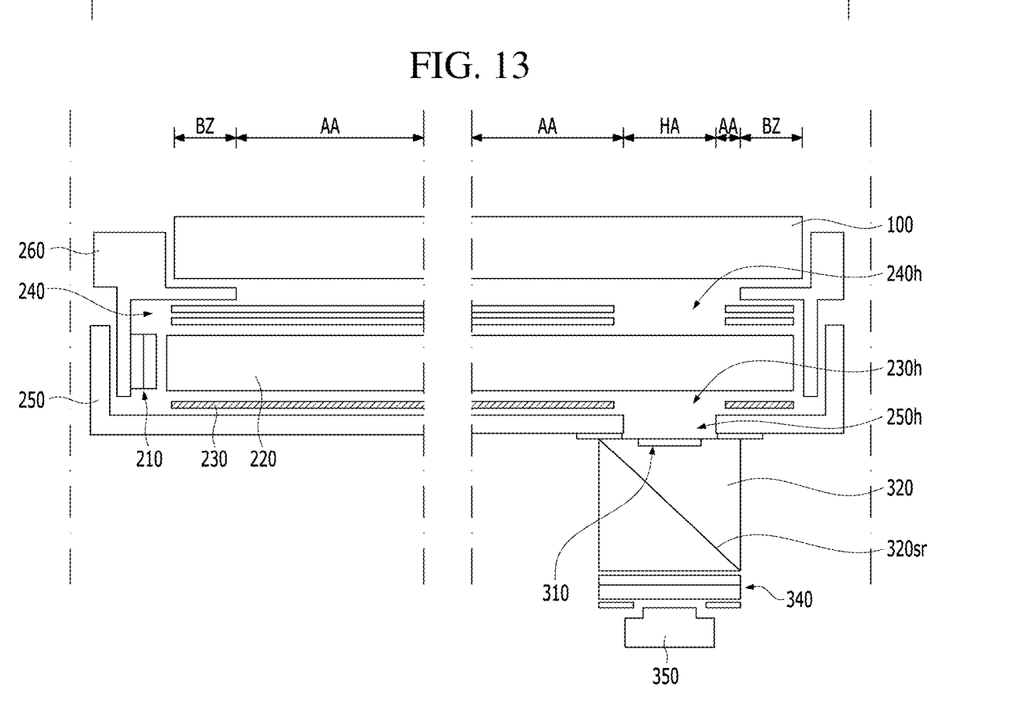

The display apparatus according to the exemplary embodiment of the present disclosure is described that the module light source device 310 and the optical device 350 may be disposed outside the sensing area HA. However, in the display apparatus according to another exemplary embodiment of the present disclosure, the optical device 350 may be disposed on a lower surface of the module light guide plate 320, as shown in FIG. 13. The lower surface of the module light guide plate 320 may be opposite to the upper surface of the module light guide plate 320. A semi-transmissive surface 320sr inclined with the upper surface and the lower surface of the module light guide plate 320 may be disposed in the module light guide plate 320. Thus, in the display apparatus according to another exemplary embodiment of the present disclosure, when the liquid crystal panel 100 generates an image, the light emitted from the module light source device 310 may be reflected toward the sensing area HA of the liquid crystal panel 100 by the semi-transmissive surface 320sr of the module light guide plate 320. And, in the display apparatus according to another exemplary embodiment of the present disclosure, when the liquid crystal panel 100 does not generate an image, the external light applied through the sensing area HA of the liquid crystal panel 100 and the back-light light guide plate 220 may be supplied to the optical device 350 by passing through the semi-transmissive surface 320sr of the module light guide plate 320. That is, in the display apparatus according to another exemplary embodiment of the present disclosure, deterioration in quality of the image due to the sensing area HA may be reduced or prevented, and the degree of freedom regarding the location of the optical device 350 may be effectively improved.

Figure 14:
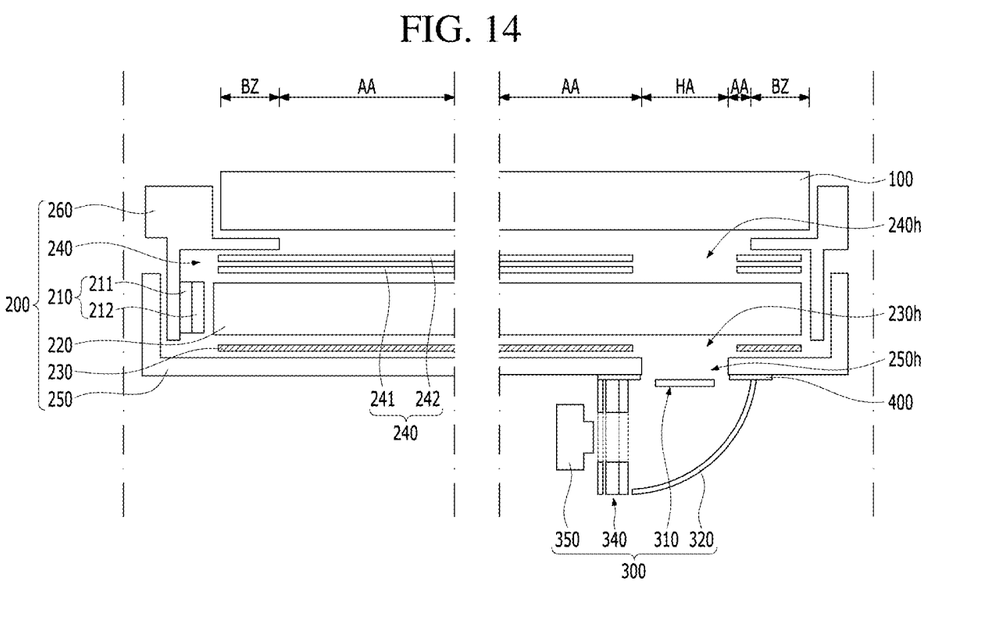

The display apparatus according to the exemplary embodiment of the present disclosure is described that the module light guide plate 320 may include the inclined surface 320c. However, in the display apparatus according to another exemplary embodiment of the present disclosure, the module light guide plate 320 may have various shapes for supplying the external light applied through the sensing area HA of the liquid crystal panel 100 and the back-light light guide plate 220 to the optical device 350. For example, in the display apparatus according to another exemplary embodiment of the present disclosure, the module light guide plate 320 may have a plate shape with a specific curvature, as shown in FIG. 14. For example, in the display apparatus according to another exemplary embodiment of the present disclosure, the external light applied through the sensing area HA of the liquid crystal panel 100 and the back-light light guide plate 220 may be reflected toward the optical device 350 due to difference in refractive index on the curved surface of the module light guide plate 320. As an example, in the display apparatus according to another exemplary embodiment of the present disclosure, the module reflecting plate may be omitted. Therefore, in the display apparatus according to another exemplary embodiment of the present disclosure, the degree of freedom regarding a shape of the module light guide plate 320 supplying the external light applied through the sensing area HA of the liquid crystal panel 100 and the back-light light guide plate 220 to the optical device 350 may be improved.

In the result, the display apparatus according to the exemplary embodiments of the present disclosure may comprise the back-light unit disposed between the optical module and the liquid crystal panel, wherein the back-light unit may include the back-light light guide plate disposed between the optical module and the liquid crystal panel, wherein the optical module may include the module light guide plate overlapping with the sensing area of the liquid crystal panel, the module light source device disposed on at least one side of the module light guide plate, and the optical device spaced apart from the module light source device, and wherein the optical device may be disposed on a path of the external light passing through the back-light light guide plate and the module light guide plate. Thus, in the display apparatus according to the exemplary embodiments of the present disclosure, the light having a same luminance as light supplied to the active area of the liquid crystal panel may be supplied to the sensing area of the liquid crystal panel. That is, in the display apparatus according to the exemplary embodiments of the present disclosure, luminance variation between the active area and the sensing area may be reduced or prevented. Thereby, in the display apparatus according to the exemplary embodiments of the present disclosure, the external light may be detected, without the deterioration in the quality of the image provided to the user.

What is claimed is:

1. A display apparatus comprising:
   a back-light unit including a first light guide plate and a first light source device;
   a liquid crystal panel on an upper surface of the first light guide plate, the liquid crystal panel including a sensing area; and
   an optical module on a lower surface of the first light guide plate, the optical module including a second light guide plate, a second light source device and an optical device,
   wherein an upper surface of the second light guide plate overlaps the sensing area of the liquid crystal panel,
   wherein the first light guide plate includes a region between the upper surface of the second light guide plate and the liquid crystal panel,
   wherein the second light source device and the optical device are outside the sensing area, and
   wherein the second light source device is on two opposing sides that are perpendicular to the upper surface of the second light guide plate.

2. The display apparatus according to claim 1, wherein the back-light unit includes a cover bottom that accommodates the first light guide plate and the first light source device, the cover bottom including a cover hole that overlaps with the sensing area of the liquid crystal panel.

3. The display apparatus according to claim 1, wherein the optical device is on a first side of the second light guide plate that is perpendicular to the upper surface of the second light guide plate, and
   wherein the second light guide plate includes an inclined surface opposite to the first side.

4. The display apparatus according to claim 3, wherein the optical module further includes a module reflecting plate on the inclined surface of the second light guide plate.

5. The display apparatus according to claim 1, wherein the optical module includes a module sheet between the optical device and the second light guide plate, and
   wherein the module sheet includes at least one hole corresponding to the optical device.

6. The display apparatus according to claim 5, wherein the module sheet includes a module adhesive layer close to the second light guide plate, and a module heat insulating layer close to the optical device.

7. The display apparatus according to claim 6, wherein the module sheet further includes a module filter layer between the module adhesive layer and the module heat insulating layer.

8. The display apparatus according to claim 7, wherein the optical device includes a camera and a sensor, and
   wherein the module sheet includes a first hole corresponding to the camera and a second hole corresponding to the sensor,
   wherein the first hole penetrates the module adhesive layer, the module heat insulating layer and the module filter layer,
   wherein the second hole penetrates the module adhesive layer and the module heat insulating layer, and
   wherein the module filter layer includes a region overlapping with the second hole.

9. The display apparatus according to claim 1, wherein the back-light unit includes a back-light sheet between the first light guide plate and the liquid crystal panel, and
   wherein the back-light sheet includes a sheet hole overlapping with the sensing area of the liquid crystal panel.

10. The display apparatus according to claim 1, wherein the optical module includes a light-blocking cover surrounding the second light source device, the second light guide plate and the optical device.

11. The display apparatus according to claim 1, wherein the second light source device and the optical device are on different surfaces of the second light guide plate.

12. The display apparatus according to claim 1, wherein when the liquid crystal panel generates an image, a light supplied to the sensing area by the second light source device has a same luminance as a light supplied to an active area of the liquid crystal panel by the first light source device.

13. A display apparatus comprising:
    a back-light unit including a first light source device on a side surface of a first light guide plate and a cover bottom accommodating the first light source device and the first light guide plate;
    a liquid crystal panel on the first light guide plate of the back-light unit, the liquid crystal panel including a sensing area; and
    an optical module including:
    a second light guide plate comprising an upper surface toward the cover bottom,
    a second light source device on at least one of two opposing sides that are perpendicular to the upper surface of the second light guide plate, and
    an optical device spaced apart from the second light source device,
    wherein the cover bottom includes a cover hole overlapping with the sensing area of the liquid crystal panel,
    wherein the second light guide plate of the optical module overlaps the sensing area of the liquid crystal panel, and
    wherein the optical device is on a path of light passing through the first light guide plate and the second light guide plate, and
    wherein the second light source device and the optical device are outside the sensing area.

14. The display apparatus according to claim 13, further comprising:
    a fixing tape contacting the cover bottom of the back-light unit and the optical module, the fixing tape passing through the cover hole.

15. The display apparatus according to claim 13, wherein the second light source device includes a module circuit board and a module light source mounted on the module circuit board, and
    wherein the second light guide plate includes an inclined surface overlapping with the module circuit board at outside of the module light source.

16. The display apparatus according to claim 13, wherein the back-light unit includes a reflecting plate between the cover bottom and the first light guide plate, and
- wherein the reflecting plate includes a penetrating hole overlapping the sensing area of the liquid crystal panel.

17. The display apparatus according to claim 13, wherein the back-light unit includes a back-light sheet between the first light guide plate and the liquid crystal panel,
- wherein the back-light sheet includes a base substrate and an optical element on the base substrate,
- wherein the base substrate includes a region overlapping the sensing area of the liquid crystal panel, and
- wherein the optical element is outside the region of the base substrate overlapping the sensing area.

18. The display apparatus according to claim 13, wherein the optical device is on a lower surface of the second light guide plate opposite to the upper surface of the second light guide plate, and
- wherein a semi-transmissive surface inclined with the upper surface and the lower surface of the second light guide plate is in the second light guide plate.

\* \* \* \* \*